United States Patent
Isaka et al.

(10) Patent No.: US 11,021,556 B2
(45) Date of Patent: Jun. 1, 2021

(54) TETRAFLUOROETHYLENE/ HEXAFLUOROPROPYLENE COPOLYMER, AND ELECTRIC WIRE

(71) Applicants: DAIKIN INDUSTRIES, LTD., Osaka (JP); DAIKIN AMERICA, INC., Orangeburg, NY (US)

(72) Inventors: Tadaharu Isaka, Settsu (JP); Ryouichi Fukagawa, Settsu (JP); Takeshi Shimono, Settsu (JP); Keizou Shiotsuki, Settsu (JP)

(73) Assignees: DAIKIN INDUSTRIES, LTD., Osaka (JP); DAIKIN AMERICA, INC., Orangeburg, NY (US)

( * ) Notice: Subject to any disclaimer, the term of this patent is extended or adjusted under 35 U.S.C. 154(b) by 863 days.

(21) Appl. No.: 15/116,406

(22) PCT Filed: Jan. 30, 2015

(86) PCT No.: PCT/JP2015/052661
§ 371 (c)(1),
(2) Date: Aug. 3, 2016

(87) PCT Pub. No.: WO2015/119053
PCT Pub. Date: Aug. 13, 2015

(65) Prior Publication Data
US 2017/0008986 A1     Jan. 12, 2017

Related U.S. Application Data

(60) Provisional application No. 61/935,949, filed on Feb. 5, 2014.

(51) Int. Cl.
*C08F 214/26* (2006.01)
*H01B 3/44* (2006.01)
*C09D 127/18* (2006.01)

(52) U.S. Cl.
CPC ........ *C08F 214/262* (2013.01); *C08F 214/26* (2013.01); *C09D 127/18* (2013.01); *H01B 3/445* (2013.01)

(58) Field of Classification Search
CPC ................................................. C08F 214/262
USPC ........................................................ 428/375
See application file for complete search history.

(56) References Cited

U.S. PATENT DOCUMENTS

2003/0157324 A1    8/2003  Kono et al.
2010/0288533 A1*  11/2010  Burch .................... C08J 9/0061
                                                                174/137 R
2010/0314153 A1   12/2010  Ishii et al.
2010/0314154 A1*  12/2010  Kitahara ............... C09D 127/18
                                                                174/110 SR
2011/0272173 A1*  11/2011  Shiotsuki .................. C08F 8/22
                                                                174/110 SR

FOREIGN PATENT DOCUMENTS

| EP | 1 262 496 A1 | 12/2002 |
|---|---|---|
| JP | 2010-539252 A | 12/2010 |
| JP | 2011-514407 A | 5/2011 |
| WO | 01/36504 A1 | 5/2001 |
| WO | 2009/044753 A1 | 4/2009 |
| WO | 2009/102660 A1 | 8/2009 |

OTHER PUBLICATIONS

Krevelen D.W. van Nijenhuis, K. te. (2009). Properties of Polymers (4th, Completely Revised Edition)—Ch. 15.6.2 Extrudate Swell Ratio or Die Swell, (pp. 575). Elsevier; https://app.knovel.com/hotlink/pdf/id:kt00984GMA/properties-polymers-their/extrudate-swell-ratio (Year: 2009).*
Sepe, M., Melt Flow Rate Testing—Part 2: Plastics Technology, https://www.ptonline.com/columns/melt-flow-rate-testing-part-2 p. 2 (Year: 2013).*
International Preliminary Report on Patentability and Written Opinion issued from the International Bureau in counterpart application No. PCT/P2015/052661, dated Aug. 9, 2016.
International Search Report for PCT/JP2015/052661 dated Apr. 28, 2015 [PCT/ISA/210].
International Preliminary Report on Patentability and Written Opinion issued from the International Bureau in counterpart application No. PCT/JP2015/052661, dated Aug. 9, 2016.
Extended European Search Report dated May 4, 2017, from the European Patent Office in counterpart European Application No. 15746456.1.

* cited by examiner

*Primary Examiner* — Marla D McConnell
*Assistant Examiner* — Kevin Worrell
(74) *Attorney, Agent, or Firm* — Sughrue Mion, PLLC

(57) ABSTRACT

Provided is a tetrafluoroethylene/hexafluoropropylene copolymer which is less likely to form a lump, or is less likely to form a large lump even if a lump is formed, during the formation of an electric wire. The tetrafluoroethylene/hexafluoropropylene copolymer has a melt flow rate measured at 372° C. of 35.0 to 45.0 g/10 minutes and a swell of −8.0% to 5.0%, the sum of the numbers of —$CF_2H$ groups and unstable end groups being 120 or less per $1\times10^6$ carbon atoms.

10 Claims, No Drawings

TETRAFLUOROETHYLENE/HEXAFLUOROPROPYLENE COPOLYMER, AND ELECTRIC WIRE

CROSS REFERENCE TO RELATED APPLICATIONS

This application is a National Stage of International Application No. PCT/JP2015/052661, filed on Jan. 30, 2015, which claims priority from U.S. Provisional Application No. 61/935,949, filed on Feb. 5, 2014, the contents of all of which are incorporated herein by reference in their entirety.

TECHNICAL FIELD

The present invention relates to a tetrafluoroethylene/hexafluoropropylene copolymer and an electric wire.

BACKGROUND ART

Fluororesins, which have excellent characteristics such as thermal resistance, chemical resistance, solvent resistance, and insulation properties, are processed into various products such as tubes, pipes, and filaments by melt extrusion molding, for example, and the products are widely commercially available. In particular, tetrafluoroethylene/hexafluoropropylene copolymers have a lower dielectric constant, a lower dielectric loss tangent, and better insulation properties than other fluororesins. Therefore, tetrafluoroethylene/hexafluoropropylene copolymers are suitably used for coating of electric wires such as cables and wires.

Production sites of coated electric wires currently require improvement in productivity and reduction in cost. Consequently, various considerations to increase the molding speed and to reduce defects in molding are proposed in the production sites.

For example, Patent Literature 1 suggests as a fluorine-containing copolymer having a good formability even in high-speed extrusion coating of an electric wire which enables coating of an electric wire without the formation of melt fracture and the fluctuation of a wire diameter, a fluorine-containing copolymer including constitutional units derived from tetrafluoroethylene, hexafluoropropylene, and at least one perfluoroalkyl vinyl ether of the formula:

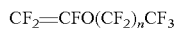

$CF_2=CFO(CF_2)_nCF_3$ (wherein n is 0 to 3),
a weight ratio of the constitutional units being (75 to 92):(8 to 20):(0 to 5), the fluorine-containing copolymer having a melt flow rate at 372° C. and a load of 5000 g of 10 to 35 g/10 min and a die swell of 5% to 20%.

Further, Patent Literature 2 suggests a tetrafluoroethylene/hexafluoropropylene copolymer formed from at least tetrafluoroethylene and hexafluoropropylene and, optionally, a third monomer, wherein the copolymer is not in admixture with a resin having a melting point at least 20° C. different from the melting point of the tetrafluoroethylene/hexafluoropropylene copolymer; and wherein the tetrafluoroethylene/hexafluoropropylene copolymer has a complex viscosity of from $2.0 \times 10^3$ to $10.0 \times 10^3$ Pa·s and a storage modulus of from 0.1 to 3.5 Pa in melt viscoelasticity measurement under conditions of ambient temperature of 310° C. and angular frequency of 0.01 rad/s.

Patent Literature 3 discloses an FEP pellet having a volatile content of 0.2% by weight or less and satisfying the requirement that an adhesive strength between the insulating material and the core wire is 0.8 kg or more, and an average number of cone-breaks in the insulating material is one or less per 50,000 ft of the coated core wire.

Patent Literature 4 discloses a fluororesin composition including polytetrafluoroethylene (PTFE) having a standard specific gravity of 2.15 to 2.30 and a tetrafluoroethylene/hexafluoropropylene copolymer (FEP), the content of the PTFE being 0.01 to 3 parts by mass per 100 parts by mass of the FEP, the alkali metal content being less than 5 ppm on the resin composition solid matter basis, the composition being obtained by a method including the step (1) of preparing a coagulated fluororesin powder by mixing an aqueous dispersion containing the FEP and an aqueous dispersion containing the PTFE together, followed by coagulation, the step (2) of melt extruding the coagulated powder, and the step (3) of subjecting the extrusion product to treatment for stabilizing unstable terminal groups of the PTFE and FEP.

CITATION LIST

Patent Literature

Patent Literature 1: WO 01/036504
Patent Literature 2: JP 2011-514407 T
Patent Literature 3: US 2003/0157324
Patent Literature 4: JP 2010-539252 T

SUMMARY OF INVENTION

Technical Problem

Conventional techniques, however, fail to sufficiently prevent the formation of lumps (mass of resin), particularly, large lumps. Accordingly, there is room for improvement in such conventional techniques.

In view of the current state of the art described above, the present invention aims to provide a tetrafluoroethylene/hexafluoropropylene copolymer which is less likely to form a lump, or is less likely to form a large lump even if a lump is formed, during the formation of an electric wire.

Solution to Problem

The present inventors have intensively studied about a tetrafluoroethylene/hexafluoropropylene copolymer which is less likely to form a lump during the formation of an electric wire, and found that a tetrafluoroethylene/hexafluoropropylene copolymer having a melt flow rate (MFR) within a specific range, a swell within a specific range, and a specific number or less of specific end groups is less likely to form a lump, or is less likely to form a large lump even if a lump is formed, during the formation of an electric wire.

That is, the present invention relates to a tetrafluoroethylene/hexafluoropropylene copolymer having a melt flow rate measured at 372° C. of 35.0 to 45.0 g/10 minutes and a swell of −8.0% to 5.0%, the sum of the numbers of —$CF_2H$ groups and unstable end groups being 120 or less per $1 \times 10^6$ carbon atoms.

The sum of the numbers of —$CF_2H$ groups and unstable end groups is preferably 50 or less, more preferably 20 or less per $1 \times 10^6$ carbon atoms.

The swell is preferably −6.0% to 4.9%.

The tetrafluoroethylene/hexafluoropropylene copolymer of the present invention preferably has a heating weight loss of 0.1% by weight or less after heating at 372° C. for 30 minutes.

The tetrafluoroethylene/hexafluoropropylene copolymer of the present invention preferably has a melting point of 245° C. to 280° C.

The tetrafluoroethylene/hexafluoropropylene copolymer of the present invention preferably includes a polymerized unit derived from tetrafluoroethylene, a polymerized unit derived from hexafluoropropylene, and a polymerized unit derived from a perfluoro(alkyl vinyl ether).

The perfluoro(alkyl vinyl ether) is preferably a perfluoro (propyl vinyl ether).

The present invention also relates to an electric wire including:
a core wire; and
a coating including the tetrafluoroethylene/hexafluoropropylene copolymer.

The electric wire is preferably a foamed electric wire.

Advantageous Effects of Invention

Since the tetrafluoroethylene/hexafluoropropylene copolymer of the present invention has the aforementioned configuration, it is less likely to form a lump, or is less likely to form a large lump even if a lump is formed, during the formation of an electric wire.

DESCRIPTION OF EMBODIMENTS

The tetrafluoroethylene (TFE)/hexafluoropropylene (HFP) copolymer of the present invention has a MFR within a specific range, a swell within a specific range, and a specific number or less of specific end groups.

The present invention will be described in detail below.

The TFE/HFP copolymer of the present invention includes a polymerized unit derived from TFE (TFE unit) and a polymerized unit derived from HFP (HFP unit).

The TFE/HFP copolymer of the present invention may be a bipolymer consisting only of a TFE unit and a HFP unit, or may be a terpolymer or multicomponent polymer containing a TFE unit, a HFP unit, and a polymerized unit(s) derived from a monomer(s) copolymerizable with TFE and HFP.

The copolymerizable monomer may be any monomer, and can appropriately be selected from ethylene, propylene, perfluoro(alkyl vinyl ethers) (PAVEs), (perfluoroalkyl)ethylenes, hydrofluoroolefins, (fluoroalkyl)ethylenes, perfluoro (alkyl allyl ethers), and the like.

The perfluoroalkyl group of these monomers preferably has 1 to 10 carbon atoms.

Examples of the PAVEs include perfluoro(methyl vinyl ether) (PMVE), perfluoro(ethyl vinyl ether) (PEVE), and perfluoro(propyl vinyl ether) (PPVE).

The TFE/HFP copolymer of the present invention is also preferably a perfluoro copolymer because it has better electrical properties.

The copolymerizable monomer is preferably PAVE, more preferably PPVE, in terms of crack resistance.

That is, the TFE/HFP copolymer of the present invention is preferably a TFE/HFP/PAVE copolymer that includes a TFE unit, a HFP unit, and a polymerized unit derived from PAVE (PAVE unit), more preferably a TFE/HFP/PPVE copolymer.

The TFE/HFP copolymer of the present invention has a mass ratio of TFE/HFP of preferably (80 to 97)/(3 to 20), more preferably (84 to 92)/(8 to 16) in terms of formability.

When the TFE/HFP copolymer of the present invention is a TFE/HFP/PAVE copolymer, the TFE/HFP/PAVE copolymer has a mass ratio of TFE/HFP/PAVE of preferably (70 to 97)/(3 to 20)/(0.1 to 10), more preferably (81 to 92)/(5 to 16)/(0.3 to 5).

The mass ratio of the polymerized units in the TFE/HFP copolymer can be determined by measuring the proportions of the polymerized units using an NMR analyzer (e.g. AC300 available from Bruker Biospin Co., Ltd., high temperature probe) or an infrared spectrometer (model 1760 available from PerkinElmer, Inc.).

The TFE/HFP copolymer of the present invention has a melt flow rate (MFR) measured at 372° C. of 35.0 to 45.0 g/10 min.

The TFE/HFP copolymer of the present invention having a MFR within the above range is less likely to form a lump, or is less likely to form a large lump even if a lump is formed, during the formation of an electric wire.

The lower limit of the MFR is preferably 35.1/10 min, more preferably 35.5 g/10 min, still more preferably 36.0 g/10 min, and the upper limit thereof is preferably 44.5 g/10 min, more preferably 44.0 g/10 min, still more preferably 42.0 g/10 min. The TFE/HFP copolymer having such a MFR may further prevent the formation of a lump during the formation of an electric wire.

The MFR is a value determined in conformity with ASTM D 1238 at a load of 5 kg and a temperature of 372° C. using a die having a diameter of 2.0 m and a length of 8 mm.

The TFE/HFP copolymer of the present invention has a swell of −8.0% to 5.0%.

The TFE/HFP copolymer of the present invention having a swell within the above range is less likely to form a lump, or is less likely to form a large lump even if a lump is formed, during the formation of an electric wire.

The lower limit of the swell is preferably −6.0%, more preferably −5.0%, still more preferably −4.0%. The swell is preferably less than 5.0%, more preferably 4.9% or less, still more preferably 4.5% or less, further still more preferably 4.0% or less. The TFE/HFP copolymer having such a swell may further prevent the formation of a lump during the formation of an electric wire.

The TFE/HFP copolymer having a swell within the above range enables selection of the temperature in molding from a wide temperature range.

The swell can be adjusted, for example, by controlling the screw speed (rpm) of a twin screw extruder used when a dry powder of the TFE/HFP copolymer obtained by polymerization is formed into pellets.

The swell is also referred to as a "die swell", and is defined as a "percentage of swelling" in JP S48-20788 B and is also expressed as a "swelling rate" in JP H02-7963 B, for example.

Since the TFE/HFP copolymer is insoluble and has a high molecular weight, it is impossible to directly measure its molecular weight distribution. Therefore, expansion tendency (swell) on melt extrusion, which is considered to be associated with the molecular weight distribution, is usually used as a measure of the molecular weight distribution.

The larger the swell, the wider the molecular weight distribution. Conversely, the smaller the swell, the narrower the molecular weight distribution.

The swell is determined in the following way.

First, using a melt indexer (e.g. KAYNESS melt indexer (Model 4002)), about 2 g of a resin is placed in a 0.376-inch cylinder maintained at 372° C.±0.5° C., and the cylinder is allowed to stand for 5 minutes to cause the temperature to reach equilibrium. Thereafter, the resin is extruded through an orifice for die swell measurement having a diameter of 1 mm (margin of error: +0.002 mm or less) under a load of 5000 g with a piston. The extruded strand is allowed to cool to room temperature, and the diameter thereof is measured.

Here, the length of the strand is 30±5 mm, and the diameter is measured at a portion 5 f 1 mm from the tip portion extruded first of the strand. The average of the diameters of three strands obtained in the same period is determined, and the die swell is calculated using the following formula:

Die swell (%)=[(SD−OD)/OD]×100

SD: the diameter of strand (average of the diameters of three strands)

OD: the diameter of the orifice (1 mm).

In the TFE/HFP copolymer of the present invention, the sum of the numbers of —$CF_2H$ groups and unstable end groups is 120 or less per $1 \times 10^6$ carbon atoms.

With such a sum of the numbers of —$CF_2H$ groups and unstable end groups, the TFE/HFP copolymer is less likely to form a lump, or is less likely to form a large lump even if a lump is formed, during the formation of an electric wire.

The sum of the numbers of —$CF_2H$ groups and unstable end groups is preferably 50 or less, more preferably 20 or less per $1 \times 10^6$ carbon atoms. With such a sum of the numbers of —$CF_2H$ groups and unstable end groups, the TFE/HFP copolymer can further prevent the formation of a lump during the formation of an electric wire.

The sum of the numbers of —$CF_2H$ groups and unstable end groups in the TFE/HFP copolymer may be 30 or more. In this case, the number of lumps formed may be slightly larger than in the case of a copolymer in which the sum of the numbers of —$CF_2H$ groups and unstable end groups is less than 30, while, when such a TFE/HFP copolymer is used for a coating of an electric wire, higher adhesion strength is expected between the core wire and the coating.

The unstable end group refers to a —COF group, a —COOH group, a —$COOCH_3$ group, a —$CONH_2$ group, and a —$CH_2OH$ group, which are present at an end of the main chain.

The numbers of —$CF_2H$ groups and unstable end groups can be determined by NMR measurement or infrared absorption spectroscopy as described in WO 2008/047906 and WO 2009/044753.

Specifically, the number of —$CF_2H$ groups can be determined from the integration value of the peak derived from the —$CF_2H$ groups obtained by $^{19}F$-NMR measurement at a temperature of "melting point of polymer+20° C." using a nuclear magnetic resonance apparatus AC300 (available from Bruker-Biospin Co., Ltd).

The number of the unstable end groups is determined as follows: a film with a thickness of 0.25 to 0.30 mm is prepared by compressing powder of the TFE/HFP copolymer of the present invention at 350° C. for 30 minutes or by cold-pressing pellets of the TFE/HFP copolymer; the resulting film is subjected to infrared absorption spectroscopy; the resulting infrared absorption spectrum is compared to the infrared absorption spectrum of a known film to identify the type of the end group; and the number of the unstable end groups is determined from the differential spectrum using the following formula:

Number of end groups (per $1 \times 10^6$ carbon atoms)=(l×K)/t l: absorbance
K: correction factor
t: film thickness (mm).

The correction factor can be determined from the infrared absorption spectrum of a model compound, and the correction factors shown in Table 1 can be used.

The TFE/HFP copolymer in which the sum of the numbers of —$CF_2H$ groups and unstable end groups is as described above can be obtained by fluorination.

Non-fluorinated copolymers may contain a —$CF_2H$ group or a thermally or electrically unstable end group (unstable end group) in some cases.

The number of these end groups can be reduced by fluorination.

The sum of the numbers of —$CF_2H$ groups and unstable end groups can be adjusted by controlling the degree of fluorination. Therefore, the non-fluorinated copolymer may or may not be completely fluorinated by fluorination.

Further, the sum of the numbers of —$CF_2H$ groups and unstable end groups can be controlled by generating —$CF_2H$ groups and unstable end groups through the decomposition of the TFE/HFP copolymer, or by mixing two or more TFE/HFP copolymers different in the sum of the numbers of —$CF_2H$ groups and unstable end groups.

The fluorination can be performed by bringing a non-fluorinated TFE/HFP copolymer into contact with a fluorine-containing compound.

The fluorine-containing compound may be any compound, and examples thereof include fluorine radical sources that generate fluorine radicals under the fluorination conditions. Examples of the fluorine radical sources include $F_2$ gas, $CoF_3$, $AgF_2$, $UF_6$, $OF_2$, $N_2F_2$, $CF_3OF$, and halogen fluorides (e.g., $IF_5$, $ClF_3$).

The fluorine radical source such as $F_2$ gas may have a concentration of 100%. In order to ensure the safety, the fluorine radical source is diluted with an inert gas to preferably 5% to 50% by mass, preferably 15% to 30% by mass. Examples of the inert gas include nitrogen gas, helium gas, and argon gas. In order to save the cost, nitrogen gas is preferred.

The fluorination can be performed under any conditions, and may be performed by bringing a molten TFE/HFP copolymer into contact with a fluorine-containing compound. The fluorination is usually performed at a temperature of not higher than the melting point of the TFE/HFP copolymer, preferably 20° C. to 220° C., more preferably 100° C. to 200° C. The fluorination is usually performed for 1 to 30 hours, preferably 5 to 20 hours.

The fluorination is preferably performed by bringing a non-fluorinated TFE/HFP copolymer into contact with a fluorine gas ($F_2$ gas).

In particular, an appropriate degree of fluorination can be achieved by controlling the temperature or time of the fluorination.

If the TFE/HFP copolymer of the present invention has a high volatile matter content, air cells tend to be generated when the copolymer is molded into a coating of an electric wire, which tends to result in instable molding. Based on this point of view, the TFE/HFP copolymer has a heating weight loss of preferably 0.1% by weight or less, more preferably 0.09% by weight or less, still more preferably 0.08% by weight or less, particularly preferably 0.07% by weight, further more preferably 0.06% by weight, still further more preferably 0.05% by weight, after heating at 372° C. for 30 minutes.

The heating weight loss is determined by the following procedures.

Using an electric furnace equipped with a turntable, a sample (TFE/HFP copolymer in the form of pellets) is placed on an aluminum cup which is already baked at 372° C. for 1 hour (the weight is expressed as A) and accurately weighed to 20±0.1 g using a precision scale (which measures in 0.1 mg increments). The entire weight is expressed by B.

Two samples accurately weighed on aluminum cups are prepared for one measurement.

The two samples are quickly placed on the turntable of the electric furnace heated to 372° C. This turntable turns at 6 rpm.

The samples are taken out from the furnace 30 minutes after the temperature in the furnace has reached 372° C. again, and quickly put into a desiccator. The samples are allowed to cool for one hour or more, and then each sample is accurately weighed with the precision scale. The measured weight is defined as C.

The heating weight loss of each sample heated at 372° C. for 30 minutes is calculated from the equation below, and the average of the heating weight losses (% by weight) of the two samples is determined.

$$\text{Heating weight loss (\% by weight)}=[(B-C)/(B-A)]\times 100$$

The lower limit of the melting point of the TFE/HFP copolymer of the present invention is preferably 245° C., more preferably 250° C. in terms of thermal resistance. Also, the upper limit of the melting point of the TFE/HFP copolymer is preferably 280° C., more preferably 270° C., still more preferably 265° C. because such a TFE/HFP copolymer is readily processed.

The melting point is a temperature corresponding to the peak obtained by measurement using a differential scanning calorimeter at a temperature rise rate of 10° C./min.

The TFE/HFP copolymer of the present invention can be synthesized by polymerizing TFE, HFP, and, optionally, a monomer copolymerizable with TFE and HFP, such as PAVE, by a usual polymerization method, such as emulsion polymerization, suspension polymerization, solution polymerization, bulk polymerization, or gas phase polymerization. The polymerization may be performed under usual conditions.

In the polymerization, a chain transfer agent such as methanol may be used in some cases.

The TFE/HFP copolymer of the present invention may be produced by polymerization and isolation without using a metal-ion-containing reagent.

When the TFE/HFP copolymer of the present invention is molded into a coating that covers a core wire with a diameter of 20.1 mil at a coat-molding speed of 1600 ft/min continuously for 2 hours so that a wire with a diameter of 33.7 mil is prepared, the number of lumps with a size of 20 mil or larger formed at the coating can be reduced to 10 or less, further to 7 or less.

The size (height) of each lump and the number of lumps can be measured with a lump detector KW32TRIO (available from Zumbach).

As described above, since being capable of forming a coating with a small number of lumps, the TFE/HFP copolymer of the present invention is particularly suitable as a material of the coating of an electric wire.

The TFE/HFP copolymer of the present invention may be in the form of pellets. The pellets can be prepared by kneading with a known melt kneader such as a single screw extruder or twin screw extruder.

The pellets are preferably prepared by kneading with a twin screw extruder. The swell can be adjusted by controlling the screw speed (number of rotations) of a twin screw extruder in kneading.

The electric wire of the present invention includes a core wire and a coating containing the TFE/HFP copolymer of the present invention. The coating is usually arranged on the periphery of the core wire.

Since the coating of the electric wire of the present invention is formed from the TFE/HFP copolymer of the present invention, the coating has only a small number of lumps, or has small lumps even if lumps are formed.

The material of the core wire may be a conductive metal material such as copper or aluminum. The diameter of the core wire is preferably 0.02 to 3 mm, more preferably 0.04 mm or more, still more preferably 0.05 mm or more, particularly preferably 0.1 mm or more. The diameter of the core wire is more preferably 2 mm or less.

Specific examples of the core wire include those satisfying AWG-46 (40-μm-diameter solid copper wires), those satisfying AWG-26 (404-μm-diameter solid copper wires), those satisfying AWG-24 (510-μm-diameter solid copper wires), and those satisfying AWG-22 (635-μm-diameter solid copper wires). Here, AWG represents the American wire gauge.

The coating contains the TFE/HFP copolymer of the present invention. The coating may consist only of the TFE/HFP copolymer of the present invention, or may contain a conventionally known filler and other components in addition to the TFE/HFP copolymer of the present invention, as long as the effects of the present invention are not impaired.

The amount of the TFE/HFP copolymer of the present invention is preferably 70% by mass or more, more preferably 80% by mass or more, still more preferably 90% by mass or more, particularly preferably 95% by mass or more, more particularly preferably substantially 100% by mass relative to the coating.

Examples of the filler include graphite, carbon fiber, coke, silica, zinc oxide, magnesium oxide, tin oxide, antimony oxide, calcium carbonate, magnesium carbonate, glass, talc, mica, mica, aluminum nitride, calcium phosphate, sericite, diatomite, silicon nitride, fine silica, alumina, zirconia, quartz powder, kaolin, bentonite, and titanium oxide. The filler may be in any form, and may be in the form of, for example, fibers, needles, powder, particles, or beads.

The coating may further contain a thermoplastic resin other than the TFE/HFP copolymer of the present invention. Examples of the thermoplastic resin other than the TFE/HFP copolymer of the present invention include general-purpose resins such as polyethylene resin, polypropylene resin, vinyl chloride resin, and polystyrene resin; and engineering plastics such as nylon, polycarbonate, polyether ether ketone resin, and polyphenylene sulfide resin.

The coating may further contain any other components such as additives. Examples of such components include fillers such as glass fiber, glass powder, and asbestos fiber, reinforcing agents, stabilizers, lubricants, pigments, and other additives.

The coating may further contain a foam nucleating agent. A foam nucleating agent is used when the coating is foamed as described below. Therefore, the coating usually contains a foam nucleating agent.

Examples of the foam nucleating agent include sulfonic acid, phosphonic acid, salts thereof, boron nitride, and inorganic salts containing a polyatomic anion.

The amount of the foam nucleating agent in the coating may be appropriately adjusted to suit the use of a resulting electric wire, and is, for example, 0.1% to 10% by mass relative to the coating.

The boron nitride may be pulverized and/or classified.

Examples of the polyatomic anion-containing inorganic salt include those disclosed in U.S. Pat. No. 4,764,538 A.

The coating may or may not be foamed.

The electric wire having a foamed coating is called a foamed electric wire. The electric wire of the present invention is also preferably a foamed electric wire.

The use of the foamed coating can provide a coated electric wire with small transmission loss.

The coating preferably has a foam content of 10% to 80%.

The coating preferably has air cells with an average diameter of 5 to 100 μm.

The foam content of the coating means a percentage of change in specific gravity of the material before and after foaming, and is determined by measuring, by the water displacement method, the percentage of change between the characteristic specific gravity of a material constituting a foam and the apparent specific gravity of the foam. The average diameter of air cells can be calculated from a microscope photograph of the cross-section of the foam.

The coating can be foamed by a conventionally known method. Examples of the method include (1) a method in which pellets of the TFE/HFP copolymer of the present invention containing a foam nucleating agent are prepared, and then extrusion coated while gas is continually introduced to the pellets, and (2) a method in which gas is generated by decomposing a chemical foaming agent, which has been mixed with the molten TFE/HFP copolymer of the present invention, through extrusion coating to provide air cells.

In the method (1), the foam nucleating agent may be a well-known one such as boron nitride (BN). Examples of the gas include chlorodifluoromethane, nitrogen, carbon dioxide, and a mixture of these.

Examples of the chemical foaming agent in the method (2) include azodicarbonamide and 4,4'-oxybis-benzene-sulfonyl hydrazide. The conditions in each method, such as the amount of the foam nucleating agent added and the amount of the gas introduced in the method (1) and the amount of the chemical foaming agent added in the method (2), can be appropriately adjusted according to the kinds of the resin and the core wire to be used or a desired thickness of the coating.

The electric wire of the present invention may include a layer formed from a material other than the coating on the periphery of the coating or may include a layer formed from a material other than the coating between the core wire and the coating.

The layer may be any resin layer formed from a polyolefin resin such as a TFE/PAVE copolymer, a TFE/ethylene copolymer, a vinylidene fluoride polymer, or polyethylene (PE), or a resin such as polyvinyl chloride (PVC). Preferred among these are PE and PVC in view of cost effectiveness.

Each of the layer and the coating may have any thickness, and the thickness of the layer is preferably 1 mil to 20 mil and the thickness of the coating is preferably 1 mil to 20 mil.

When the electric wire of the present invention is a foamed electric wire, it may have a double-layered (skin-foam) structure including a core wire, the coating, and a non-foamed layer disposed between the core wire and the coating, a double-layered (foam-skin) structure including a non-foamed layer that coats the outer layer of the coating, or a triple-layered (skin-foam-skin) structure including a non-foamed layer that coats the outer layer of the skin-foam structure.

The non-foamed layer of the foamed electric wire may be any resin layer formed of a polyolefin resin such as a TFE/HFP copolymer, a TFE/PAVE copolymer, a TFE/ethylene copolymer, a vinylidene fluoride polymer, or polyethylene (PE), or a resin such as PVC.

The electric wire of the invention is suitable as an insulated wire for communication. Examples of the insulated wire for communication include cables for connecting a computer with a peripheral device such as data transmission cables (e.g. LAN cables). The insulated wire is also suitable for plenum cables to be installed in a space in the ceiling cavity (plenum area) of a building.

The electric wire of the present invention is also suitable for high-frequency coaxial cables, flat cables, and heat-proof cables. In particular, the electric wire is suitable for high-frequency coaxial cables.

The outer layer of a coaxial cable is not limited, and may be a conductive layer made of an outer conductor such as a metal mesh, or may be a resin layer (sheath layer) made of a TFE unit-containing fluorine-containing copolymer such as a TFE/HFP copolymer or a TFE/PAVE copolymer, PVC, PE, or any other resin.

The coaxial cable may be a cable that includes an outer conductive layer made of a metal on the periphery of the coated electric wire of the present invention, and the resin layer (sheath layer) on the periphery of the outer conductive layer.

A method for producing the electric wire of the present invention is described below.

The electric wire of the present invention can be prepared by a production method including the step of forming a coating by coating a core wire with the TFE/HFP copolymer of the present invention.

The core wire may be coated with the TFE/HFP copolymer of the present invention by a conventionally known coating method using an extruder.

The coating may be formed by applying a composition containing the TFE/HFP copolymer of the present invention, the filler described above, a thermoplastic resin other than the TFE/HFP copolymer of the present invention, other components such as additives, a foam nucleating agent, and a chemical foaming agent.

The composition can be prepared by mixing the TFE/HFP copolymer of the present invention, the filler described above, a thermoplastic resin other than the TFE/HFP copolymer of the present invention, other components such as additives, and a foam nucleating agent.

The composition can also be prepared by mixing a non-fluorinated TFE/HFP copolymer, the filler described above, a thermoplastic resin other than the TFE/HFP copolymer of the present invention, other components such as additives, a foam nucleating agent, and a chemical foaming agent, and then fluorinating the non-fluorinated TFE/HFP copolymer.

The mixing may be performed by a method using a Henschel mixer, a ribbon mixer, a V-blender, or a ball mill, for example. The mixing may also be performed, for example, by melt-kneading.

The composition may be prepared by kneading the above mixture obtained by mixing. The kneading can provide pellets. The kneading can be performed by a method using a conventionally known melt-kneader such as a single screw extruder or a twin screw extruder.

The fluorination may be performed on the composition (e.g. pellets) after kneading. For example, the fluorination may be performed by bringing the pellets prepared through the kneading into contact with the fluorine-containing compound.

When the coating is not a foamed one, the formation of a lump can be further prevented. Therefore, the coating speed in the formation of the coating is preferably 500 to 2500 ft/min, more preferably 1000 to 1600 ft/min.

The electric wire of the present invention is also preferably a foamed electric wire.

When the coating is a foamed one, that is, when the electric wire of the present invention is a foamed electric wire, the electric wire of the present invention can be prepared by a conventional method except that the TFE/HFP copolymer of the present invention is used. For example, the electric wire can be produced by extrusion foaming. Preferred molding conditions can be appropriately selected according to the formulation of the composition to be used and the size of the core wire.

The core wire is coated with the TFE/HFP copolymer of the present invention, for example, by a method in which the TFE/HFP copolymer of the present invention is fed into a screw extruder designed for foaming operations, and a continuous gas injection method is performed using a gas soluble in the molten TFE/HFP copolymer of the present invention (molten resin). The gas may be the same as that used in the method for producing a foam.

Preferably, the resulting coating includes a melt-solidified matter of the TFE/HFP copolymer of the present invention and air cells, and the air cells are uniformly distributed in the melt-solidified matter. The air cells may have any average cell size. For example, the average cell size is preferably 60 μm or smaller, more preferably 45 μm or smaller, still more preferably 35 μm or smaller, much more preferably 30 μm or smaller, particularly preferably 25 μm or smaller, more particularly preferably 23 μm or smaller. The average cell size is also preferably 0.1 μm or greater, more preferably 1 μm or greater.

The average cell size is determined as follows: an image of the cross section of the coating is taken by a scanning electron microscope (SEM), the image is processed to determine the diameter of each air cell, and the average cell size of the air cells is calculated.

The coating preferably has a foam content of 10% or higher. It is more preferably 20% or higher, still more preferably 30% or higher, much more preferably 35% or higher. The upper limit thereof may be, but not limited to, for example, 80%. The upper limit of the foam content may be 60%.

The foam content is determined by [{(specific gravity of TFE/HFP copolymer)−(specific gravity of foamed body)}/ (specific gravity of TFE/HFP copolymer)]×100. The foam content can be appropriately be adjusted to suit the use of the electric wire by, for example, controlling the amount of gas introduced into the extruder or selecting the type of gas to be dissolved.

EXAMPLE

The present invention will be described based on examples below.

The properties herein were measured by the following methods.

(Formulation)

The mass ratio of the polymerized units in the TFE/HFP copolymer was determined by measuring the proportions of the polymerized units using an NMR analyzer (e.g. AC300 available from Bruker Biospin Co., Ltd., high temperature probe) or an infrared spectrometer (model 1760 available from PerkinElmer, Inc.).

(Melting Point)

The melting point of the TFE/HFP copolymer was a temperature corresponding to the peak obtained by measurement using a differential scanning calorimeter (RDC220 available from Seiko Instruments Inc.) at a temperature rise rate of 10° C./min.

(MFR)

The MFR of the TFE/HFP copolymer was measured in conformity with ASTM D 1238 using a KAYENESS melt indexer (Series 4000 available from YASUDA SEIKI SEI-SAKUSHO, LTD.) with a die having a diameter of 2.1 mm and a length of 8 mm at a temperature of 372° C. and a load of 5 kg.

(Swell)

Using a KAYNESS melt indexer (Model 4002), about 2 g of a resin was placed in a 0.376-inch cylinder maintained at 372° C.±0.5° C., and the cylinder was allowed to stand for 5 minutes to cause the temperature to reach equilibrium. Thereafter, the resin was extruded through an orifice for die swell measurement having a diameter of 1 mm (margin of error: +0.002 mm or less) under a load of 5000 g with a piston. The extruded strand was allowed to cool to room temperature, and the diameter thereof was measured.

Here, the length of the strand was 30±5 mm, and the diameter was measured at a portion 5±1 mm from the tip portion extruded first of the strand. The average of the diameters of three strands obtained in the same period was determined, and the die swell was calculated using the following formula:

$$\text{Die swell } (\%)=[(SD-OD)/OD]\times 100$$

SD: the diameter of strand (average of the diameters of three strands)

OD: the diameter of the orifice (1 mm).

(The Number of —CF$_2$H Groups)

The number of —CF$_2$H groups was determined from the integration value of the peak derived from the —CF$_2$H groups obtained by $^{19}$F-NMR measurement at a temperature of "melting point of polymer+20° C." using a nuclear magnetic resonance apparatus AC300 (available from Bruker-Biospin Co., Ltd).

(The Number of Unstable End Groups)

The number of the unstable end groups was determined as follows: a film with a thickness of 0.25 to 0.30 mm was prepared by cold-pressing the resulting pellets; the film was subjected to infrared absorption spectroscopy; the resulting infrared absorption spectrum was compared to the infrared absorption spectrum of a known film to identify the type of the end group; and the number of the unstable end groups was determined from the differential spectrum using the following formula:

$$\text{Number of end groups (per } 1\times 10^6 \text{ carbon atoms)}=(l\times K)/t$$

l: absorbance

K: correction factor t: film thickness (mm).

Table 1 shows the correction factors and absorption frequencies of the target end groups.

TABLE 1

| End group | Absorption frequency (cm$^{-1}$) | Correction factor |
| --- | --- | --- |
| COF group | 1884 | 405 |
| COOH group | 1813 (1795-1792) | 455 |
| COOCH$_3$ group | 1795 | 355 |
| CONH$_2$ group | 3438 | 480 |
| CH$_2$OH group | 3848 | 2325 |

The correction factor was determined from the infrared absorption spectrum of a model compound so that the number of the end groups per 1×10⁶ carbon atoms is calculated.

(Heating Weight Loss)

Using an electric furnace equipped with a turntable, a sample (TFE/HFP copolymer in the form of pellets) was placed on an aluminum cup which was already baked at 372° C. for 1 hour (the weight was expressed as A), and accurately weighed to 20±0.1 g using a precision scale (which measured in 0.1 mg increments). The entire weight was expressed as B.

Two samples were prepared for one measurement.

The two samples were quickly placed on the turntable of the electric furnace heated to 372° C. This turntable turned at 6 rpm.

The samples were taken out from the furnace 30 minutes after the temperature in the furnace had reached 372° C. again, and quickly put into a desiccator. The samples were allowed to cool for one hour or more, and then each sample was accurately weighed with the precision scale. The measured weight was defined as C.

The heating weight loss of each sample heated at 372° C. for 30 minutes was calculated from the equation below, and the average of the heating weight losses (% by weight) of the two samples was determined.

$$\text{Heating weight loss (\% by weight)} = [(B-C)/(B-A)] \times 100$$

(Lump Size)

The size (height) of lumps with a size of 20 mil or larger was measured using a lump detector KW32TRIO (available from Zumbach). The average of the sizes of lumps in Table 2 was the arithmetic average of the sizes of lumps formed during two-hour molding.

(Lump Frequency)

The frequency of lumps (number of formed lumps) with a size of 20 mil or larger was determined with a lump detector KW32TRIO (available from Zumbach).

Example 1

Polymerization

An autoclave (1000 L) equipped with a stirrer was charged with 265 kg of deionized water, and sufficiently purged with nitrogen under vacuum. Thereafter, the air was removed to create a vacuum in the autoclave, and the autoclave was charged with 274 kg of HFP, 31 kg of TFE, and 3.0 kg of PPVE under vacuum, and heated to 32° C. Next, 1.7 kg of a 8% solution of di(ω-hydroperfluorohexanoyl)peroxide (hereinafter, abbreviated to "DHP") in perfluorohexane was put into the autoclave to initiate polymerization. The internal pressure of the autoclave at the start of the polymerization was set at 1.04 MPa, and this pressure was maintained by successively adding TFE. After 2 hours and 4 hours from the start of the polymerization, 1.7 kg of a 8% solution of DHP in perfluorohexane was added and the internal pressure was reduced by 0.01 MP. Further, after 6 hours, 8 hours, and 10 hours from the start of the polymerization, 1.3 kg of a 8% solution of DHP in perfluorohexane was added and the internal pressure was reduced by 0.01 MP. Thereafter, 1.7 kg of a 8% solution of DHP in perfluorohexane was added and the internal pressure was reduced by 0.01 MP every 2 hours. Here, 0.7 kg of PPVE was added when the total amount of TFE successively added reached 53 kg, 106 kg, and 159 kg.

Further, when the total amount of TFE successively added reached 40 kg, 4.0 kg of methanol was fed into the autoclave.

The polymerization was terminated when the total amount of TFE successively added reached 233 kg. After the termination of the polymerization, unreacted TFE and HFP were discharged to give wet powder. The wet powder was combined with pure water, and washed by stirring. Thereafter, the wet powder was dried at 150° C. for 10 hours to give 273 kg of dry powder.

(Pelletization)

Subsequently, the resulting dry powder was pelletized using a twin screw extruder at 370° C. and a screw speed of 300 rpm, and the pellets were subjected to deaeration at 200° C. for 8 hours.

(Fluorination)

The resulting pellets were placed in a vacuum vibration reactor, and heated to 200° C. After vacuuming, $F_2$ gas diluted to 20% with $N_2$ gas was introduced so that the pressure was increased to atmospheric pressure. After 3 hours from the introduction of the $F_2$ gas, vacuuming was performed and then $F_2$ gas was again introduced. The introduction of $F_2$ gas and the vacuuming were repeated 6 times in total. Finally, the inside of the reactor was purged with $N_2$ gas to terminate the reaction. The resulting pellets had a MFR of 37.4 g/10 min, a swell of −0.1%, no $CF_2H$ groups and no unstable end groups, a heating weight loss of 0.05% by weight, and a melting point of 256.5° C.

The formulation of the TFE/HFP/PPVE copolymer was evaluated to give a weight ratio of TFE/HFP/PPVE of 87.5/11.5/1.0.

Example 2

Polymerization

Dry powder was prepared by performing polymerization in the same manner as in Example 1 except that the amount of methanol was changed to 4.1 kg.

(Pelletization)

The resulting dry powder was pelletized in the same manner as in Example 1 except that the screw speed was changed to 297 rpm. The pellets treated with $F_2$ gas had a MFR of 36.3 g/10 min. The swell, the sum of the numbers of $CF_2H$ groups and unstable end groups, the heating weight loss, and the melting point are as shown in Table 2.

The formulation of the TFE/HFP/PPVE copolymer was evaluated to give a weight ratio of TFE/HFP/PPVE of 87.5/11.5/1.0.

Example 3

Polymerization

Dry powder was prepared by performing polymerization in the same manner as in Example 1 except that the amount of methanol was changed to 3.2 kg.

(Pelletization)

The resulting dry powder was pelletized in the same manner as in Example 1 except that the screw speed was changed to 315 rpm. The pellets treated with $F_2$ gas had a MFR of 35.1 g/10 min. The swell, the sum of the numbers of $CF_2H$ groups and unstable end groups, the heating weight loss, and the melting point are as shown in Table 2.

The formulation of the TFE/HFP/PPVE copolymer was evaluated to give a weight ratio of TFE/HFP/PPVE of 87.5/11.5/1.0.

Example 4

Polymerization

Dry powder was prepared by performing polymerization in the same manner as in Example 1 except that the amount of methanol was changed to 4.2 kg.
(Pelletization)

The resulting dry powder was pelletized in the same manner as in Example 1 except that the screw speed was changed to 320 rpm. The pellets treated with $F_2$ gas had a MFR of 44.1 g/10 min. The swell, the sum of the numbers of $CF_2H$ groups and unstable end groups, the heating weight loss, and the melting point are as shown in Table 2.

The formulation of the TFE/HFP/PPVE copolymer was evaluated to give a weight ratio of TFE/HFP/PPVE of 87.5/11.5/1.0.

Comparative Example 1

Polymerization

Dry powder was prepared by performing polymerization in the same manner as in Example 1 except that the amount of methanol was changed to 4.9 kg.
(Pelletization)

The resulting dry powder was pelletized in the same manner as in Example 1 except that the screw speed was changed to 275 rpm. The pellets treated with $F_2$ gas had a MFR of 37.0 g/10 min. The swell, the sum of the numbers of $CF_2H$ groups and unstable end groups, the heating weight loss, and the melting point are as shown in Table 2.

The formulation of the TFE/HFP/PPVE copolymer was evaluated to give a weight ratio of TFE/HFP/PPVE of 87.5/11.5/1.0.

Comparative Example 2

Polymerization

Dry powder was prepared by performing polymerization in the same manner as in Example 1 except that the amount of methanol was changed to 1.6 kg.
(Pelletization)

The resulting dry powder was pelletized in the same manner as in Example 1 except that the screw speed was changed to 360 rpm. The resulting pellets prepared using an extruder had a MFR of 34.9 g/10 min, and the pellets treated with $F_2$ gas had a MFR of 35.8 g/10 min. The swell, the sum of the numbers of $CF_2H$ groups and unstable end groups, the heating weight loss, and the melting point are as shown in Table 2.

The formulation of the TFE/HFP/PPVE copolymer was evaluated to give a weight ratio of TFE/HFP/PPVE of 87.5/11.5/1.0.

Comparative Example 3

Pelletization

The dry powder prepared in Comparative Example 1 was pelletized in the same manner as in Example 1 except that the screw speed was changed to 325 rpm. The pellets treated with $F_2$ gas had a MFR of 52.2 g/10 min. The swell, the sum of the numbers of $CF_2H$ groups and unstable end groups, the heating weight loss, and the melting point are as shown in Table 2.

Comparative Example 4

Polymerization

Dry powder was prepared by performing polymerization in the same manner as in Example 1 except that the amount of methanol was changed to 3.1 kg.
(Pelletization)

The resulting dry powder was pelletized in the same manner as in Example 1 except that the screw speed was changed to 295 rpm. The resulting pellets prepared using an extruder had a MFR of 29.0 g/10 min, and the pellets treated with $F_2$ gas had a MFR of 30.5 g/10 min. The swell, the sum of the numbers of $CF_2H$ groups and unstable end groups, the heating weight loss, and the melting point are as shown in Table 2.

The formulation of the TFE/HFP/PPVE copolymer was evaluated to give a weight ratio of TFE/HFP/PPVE of 87.5/11.5/1.0.

Comparative Example 5

Pelletization

The dry powder prepared in Example 4 was pelletized in the same manner as in Example 4 except that no $F_2$ gas treatment was performed. The resulting pellets prepared using an extruder had a MFR of 42.0 g/10 min. The swell, the sum of the numbers of $CF_2H$ groups and unstable end groups, the heating weight loss, and the melting point are as shown in Table 2.
(Production of Electric Wire)

Electric wires were produced using the pellets prepared in Examples 1 to 4 and Comparative Examples 1 to 5, and evaluated for lump size and lump frequency. In Comparative Example 3, an electric wire could not be continuously formed due to surging. Accordingly, a lump could not be evaluated.

Specifically, a single-screw extruder (available from Davis-Standard) having a cylinder with a cylinder diameter of 2 inches and an L/D ratio of 30 was provided with a crosshead (available from Unitek). The crosshead was equipped with a die having an inner diameter of 0.280 inches and a chip having an outer diameter of 0.160 inches. An electric wire was produced so as to have a final outer diameter of 0.0337 inches using a core wire (AWG 24) with an outer diameter of 0.0201 inches under the conditions of a time of 2 hours, a speed of 1600 ft/min, and a temperature shown in Table 3. Thereafter, the lump size and the number of lumps were evaluated.

TABLE 2

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Screw speed (rpm) | 300 | 297 | 315 | 320 | 275 | 360 | 325 | 295 | 320 |
| MFR (g/10 min) of pellets used for production of electric wire | 37.4 | 36.3 | 35.1 | 44.1 | 37.0 | 35.8 | 52.2 | 30.5 | 42.0 |
| Swell (%) | −0.1 | 3.9 | −3.4 | −1.0 | 13.6 | −8.5 | −3.3 | 1.1 | −0.8 |
| Sum of the numbers of $CF_2H$ groups and unstable end groups | 0 | 0 | 0 | 0 | 0 | 0 | 0 | 0 | 565 |
| Heating weight loss (% by weight) | 0.05 | 0.05 | 0.04 | 005 | 0.08 | 0.03 | 0.04 | 0.04 | 0.08 |
| Melting point (° C.) | 256.5 | 256.7 | 255.0 | 254.5 | 255.2 | 254.5 | 256.0 | 255.2 | 254.5 |
| Formulation (the third component) | PPVE | PPVE | PPVE | PPVE | PPVE | PPVE | PPVE | PPVE | PPVE |
| Evaluation of electric wire Number of lumps formed in 2 hr | | | | | | | | | |
| 20 mil or larger - 30 mil or smaller | 1 | 2 | 0 | 2 | 2 | 1 | N/A | 1 | 3 |
| Larger than 30 mil - 40 mil or smaller | 3 | 2 | 4 | 4 | 4 | 2 | N/A | 1 | 2 |
| Larger than 40 mil - 50 mil or smaller | 1 | 2 | 1 | 0 | 4 | 3 | N/A | 4 | 6 |
| Larger than 50 mil - 60 mil or smaller | 1 | 1 | 0 | 0 | 4 | 3 | N/A | 10 | 6 |
| Larger than 60 mil - 70 mil or smaller | 0 | 0 | 0 | 1 | 2 | 3 | N/A | 8 | 2 |
| Larger than 70 mil | 0 | 0 | 0 | 0 | 0 | 1 | N/A | 2 | 0 |
| Average size of lumps formed in 2 hr (mil) | 38.3 | 37.9 | 37.0 | 36.4 | 45 | 51.2 | N/A | 56.2 | 46.1 |
| Number of lumps formed in 2 hr | 6 | 7 | 5 | 7 | 16 | 13 | N/A | 26 | 19 |

TABLE 3

| | Zone-1 | Zone-2 | Zone-3 | Zone-4 | Zone-5 | Clump | Adaptor | Crosshead | Die |
|---|---|---|---|---|---|---|---|---|---|
| Condition (° C.) | 580 | 650 | 680 | 700 | 720 | 730 | 730 | 730 | 750 |

INDUSTRIAL APPLICABILITY

The TFE/HFP copolymer of the present invention is suitable for a material for forming a coating of an electric wire.

The invention claimed is:

1. A tetrafluoroethylene/hexafluoropropylene copolymer having a melt flow rate measured at 372° C. of 35.0 to 45.0 g/10 minutes and a die swell of −8.0% to 5.0%, and
    the sum of the numbers of —$CF_2H$ groups and unstable end groups being 120 or less per 1×10$^6$ carbon atoms,
    wherein die swell is measured by extruding the copolymer maintained at 372° C.±0.5° C. through an orifice having a diameter of 1 mm under a load of 5000 g with a piston to obtain an extruded strand, allowing the extruded strand to cool to room temperature, measuring the diameter of the cooled strand at a portion 5±1 mm from a first extruded tip portion of the strand, obtaining an average of the diameters of three strands obtained in the same period, and calculating the die swell according to the following formula:

die swell (%)=[(SD−OD)/OD]×100 where SD: the diameter of strand (average of the diameters of three strands) and OD: the diameter of the orifice (1 mm).

2. The tetrafluoroethylene/hexafluoropropylene copolymer according to claim 1,
    wherein the sum of the numbers of —$CF_2H$ groups and unstable end groups is 50 or less per 1×10$^6$ carbon atoms.

3. The tetrafluoroethylene/hexafluoropropylene copolymer according to claim 1,
    wherein the die swell is −6.0% to 4.9%.

4. The tetrafluoroethylene/hexafluoropropylene copolymer according to claim 1,
    wherein the sum of the numbers of —$CF_2H$ groups and unstable end groups is 20 or less per 1×10$^6$ carbon atoms.

5. The tetrafluoroethylene/hexafluoropropylene copolymer according to claim 1, which has a heating weight loss of 0.1% by weight or less after heating at 372° C. for 30 minutes.

6. The tetrafluoroethylene/hexafluoropropylene copolymer according to claim 1, which has a melting point of 245° C. to 280° C.,
    wherein melting point is determined as being a temperature corresponding to a peak obtained by measurement using a differential scanning calorimeter at a temperature rise rate of 10° C./min.

7. The tetrafluoroethylene/hexafluoropropylene copolymer according to claim 1, comprising a polymerized unit derived from tetrafluoroethylene, a polymerized unit derived from hexafluoropropylene, and a polymerized unit derived from a perfluoro(alkyl vinyl ether).

8. The tetrafluoroethylene/hexafluoropropylene copolymer according to claim 7,
    wherein the perfluoro(alkyl vinyl ether) is perfluoro(propyl vinyl ether).

9. An electric wire comprising:
    a core wire; and
    a coating including the tetrafluoroethylene/hexafluoropropylene copolymer according to claim 1.

10. The electric wire according to claim 9, which is a foamed electric wire.

* * * * *